United States Patent [19]

Radcliffe et al.

[11] 3,751,591

[45] Aug. 7, 1973

[54] ZERO SKEW CLOCK DISTRIBUTION SYSTEM

[75] Inventors: Jerry K. Radcliffe; Gerald W. Whalen, both of Owego, N.Y.

[73] Assignee: International Business Machines Corporation, Armonk, N.Y.

[22] Filed: June 20, 1972

[21] Appl. No.: 264,674

[52] U.S. Cl. .................. 178/68, 325/65, 328/56, 328/105, 333/33

[51] Int. Cl. .................. H04l 15/00

[58] Field of Search .............. 178/68; 179/69.5 DC; 325/42, 65; 328/55, 56, 57, 62, 105, 151; 333/9, 20, 29, 33, 32

[56] References Cited

UNITED STATES PATENTS 3,497,619 2/1970 Babcock .................. 178/68

*Primary Examiner*—Albert J. Mayer
*Attorney*—John C. Black et al.

[57] ABSTRACT

In a clock pulse distribution system, a clock pulse driver has an impedance matching that of the transmission line it drives. The rise and fall times of the driver output pulses are slow relative to the line delay time so that all circuits coupled to the line respond to the pulse transitions simultaneously, eliminating skew in the system.

8 Claims, 3 Drawing Figures

ZERO SKEW CLOCK DISTRIBUTION SYSTEM

BACKGROUND OF THE INVENTION

In data processing systems, it is often required to distribute clock pulses to many circuits spread over a considerable space with a small time skew. Previously, this has required high power clock drivers and adjustment of transmission line lengths from the driver to the loads resulting in high power levels and complex wiring.

SUMMARY OF THE INVENTION

This disclosure describes a means to distribute clock pulses in an electronic system. It reduces skewing of the pulses due to variations in wiring delay.

Typically, in known schemes, a central clock generator is distributed to various points in the system for control purposes; and it is essential that the clock pulses appear at the various points with a minimum of time skew in a synchronous machine. But, the various points are at different physical distances from the clock source and skewing will occur due to variations in the wiring delay.

The improved scheme of the present application mitigates that skewing. It consists of two parts:

1. A controlled impedance driver matched to a transmission line to minimize reflections and having a slow rise time.

2. A transmission line system arranged so that reflections within the system cause all points in the system to have the same voltage at the same time when the system is excited by the driver.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
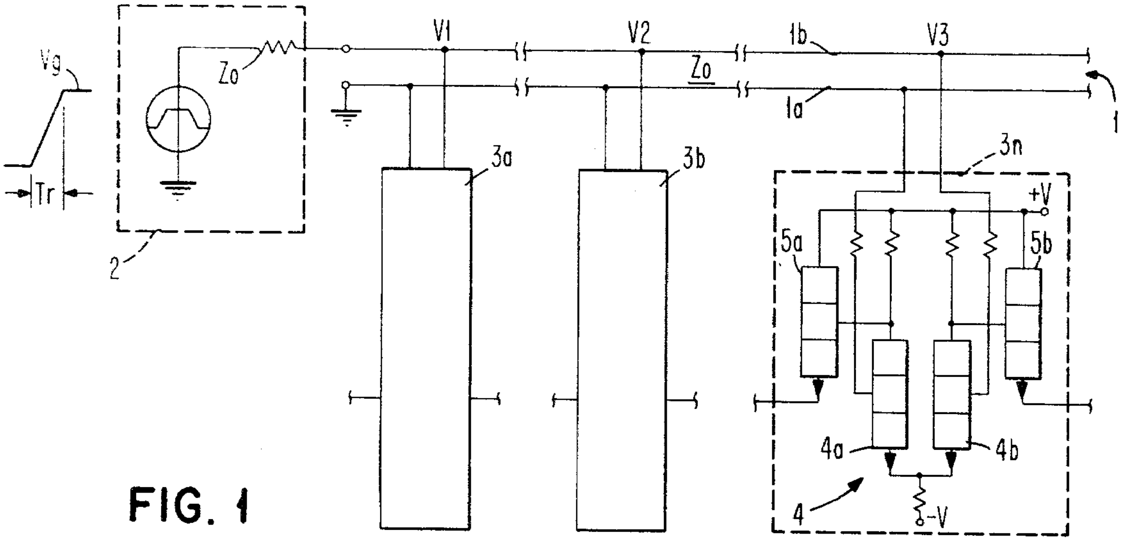
FIG. 1 illustrates diagrammatically a clock distribution system employing the improvement in conjunction with an open ended transmission line.

In FIG. 1, an open ended transmission line 1 is driven by a matched impedance slow rise time source or driver 2. Receivers 3*a*–3*n* are coupled to the line at spaced points and respond to transitions in the driver output signals. By way of example, the line delay T is selected as 5ns (nanoseconds) and the line and driver output impedances *Zo* and 50 ohms. One suitable form of driver is that marketed by Systron Donner Corporation as the Model III pulse generator.

Figure 3:
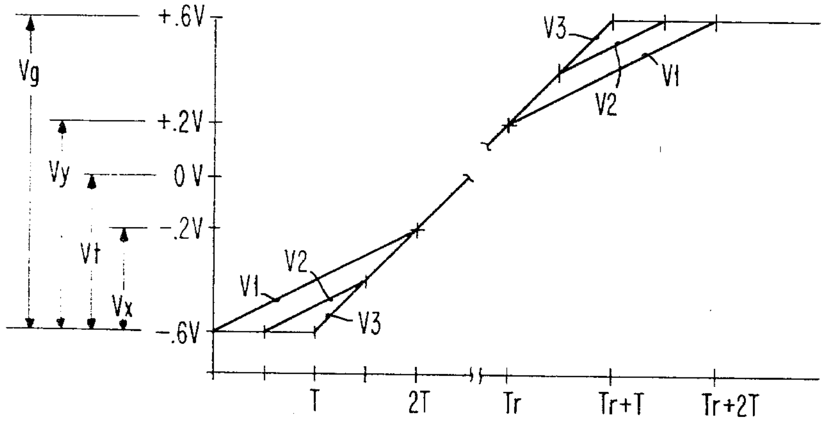
FIG. 3 graphically illustrates the rise time of the line voltages at different points in FIG. 1 in response to a clock output transition.

As seen in FIGS. 1 and 3, V*g* represents the voltage transition of the driver output, e.g. between +0.6V and −0.6V or 1.2 volts; T*r*, the rise time of the driver output voltage; and V1, V2 and V3, the voltage levels at the interconnections between the line 1 and the receivers 3*a*–3*n*.

FIG. 3 illustrates the changes in V1, V2 and V3 in response to a positive transition in the output of driver 1.

As may be seen, the ramp reflected from the open end adds to the incident ramp at each point so that after a time interval of 2T has elapsed, all points on the line are at the same voltage. This occurs at a voltage level of:

$$Vx = Vg\ (T/Tr) \quad (1)$$

where *Tr* is the rise time of the driver output.

A departure from equal voltage occurs at the end of the rise time at:

$$Vy = Vg\ [(1 - (T/Tr)] \quad (2)$$

If the threshold voltage V*t* of the circuits 3*a*–3*n* along the line is $Vx<Vt<Vy$, then all circuits will switch simultaneously from one state to another and with zero skew.

For proper operation of the system, the rise time Tr must be slowed to:

$$Tr \geq (Vg/Vt)\ T \quad (3)$$

and $$Tr > Vg/(Vg - Vt)\ T \quad (4)$$

The delay *D* of the system (start of ramp until *Vt* is reached) will then be:

$$D = T + (Vt/Vg)\ Tr \quad (5)$$

It was assumed above that $Vg = 1.2$ volts and $T = 5$ns. If the threshold Vt of the circuits 3*a*–3*n* is selected to be 0.6 volts, then the rise time $Tr \geq 10$ns (Equations 3, 4), e.g. 15ns.

With *Tr* assumed to be 15ns, *Vx* equals 0.4 volts (Equation 1) and *Vy* equals 0.8 volts (Equation 2).

The delay *D* is then equal to 12.5ns (Equation 5).

A suitable form of clock responsive circuit is shown with respect to circuit 3*n*. The circuit 3*n* includes a differential amplifier 4 comprising transistors 4*a*, 4*b*. The base electrodes of the transistors 4*a* and 4*b* are coupled to opposite conductors 1*a* and 1*b* of the transmission line 1 and are biased to respond to clock pulse transitions through the threshold voltage *Vt*. When line 1*b* is positive, transistors 4*a* and 4*b* are off and on respectively; when line 1*b* is negative, transistors 4*a* and 4*b* are on and off respectively.

Emitter followers 5*a* and 5*b* couple the outputs of the differential amplifier 4 to utilization circuits (not shown).

Figure 2:
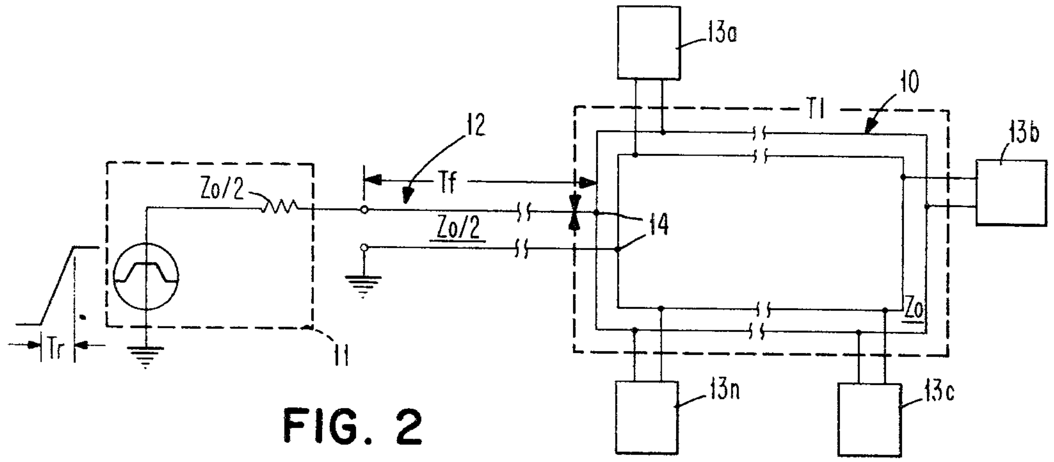
FIG. 2 illustrates a second embodiment with a closed loop transmission line.

A second embodiment is shown in FIG. 2. A closed loop transmission line 10 of impedance Z*o* is used to couple clock signals to receiver circuits 13*a*–13*n*. The loop is fed by a source 11 having an impedance Z*o*/2 which is coupled to the loop 10 by a transmission line 12 of impedance Z*o*/2. The given impedances have the effect that the waves coming back on the feed line 12 and loop junction 14 after traveling around the loop cancel and give no reflections on the loop.

The operation is similar to the single line system except that T in the previous equations will be replaced by $Tl/2$ (one half the loop time delay) and the delay $D$ becomes:

$$Dl = Tf + Tl/2 + (Vt/Vg)\ Tr$$

where $Tf$ is the feed line delay.

This system will permit faster operation than the single line system if the inputs are arranged so that a closed loop is possible.

While the invention has been particularly shown and described with reference to preferred embodiments thereof, it will be understood by those skilled in the art that various changes in form and details may be made without departing from the spirit and scope of the invention.

We claim:

1. A method of distributing synchronizing signals in electronic apparatus so that gating controls are activated with minimum skew, said method comprising the steps of providing a plurality of circuits in the gating controls which switch to first and second states in response to input signals above and below a predetermined threshold voltage level respectively, coupling each of the circuits to a transmission line having a known signal delay time and a known characteristic impedance, applying signals, having transitions between voltage levels above and below said threshold level, to the line by way of a source with an output impedance having a predetermined relationship with that of the line to minimize reflections, and controlling the transition times of the signal transitions of one polarity to be sufficiently long to permit the voltage level at all points along the transmission line to be equal when said threshold level is reached during said transitions of one polarity, whereby all of the circuits respond simultaneously to said transitions of one polarity.

2. A method of distributing synchronizing signals in electronic apparatus so that gating controls are activated with minimum skew, said method comprising the steps of providing circuits in the gating controls all of which switch to first and second states in response to input signals above and below a predetermined threshold voltage level respectively, coupling each of the circuits to spaced positions of a transmission line having a known signal delay time and a known characteristic impedance, applying signals, having transitions between voltage levels above and below said threshold level, to the line by way of means including a signal source having an impedance matching that of the line to minimize reflections, and controlling the transition times of the signals to be sufficiently long to permit the voltage level at all points along the transmission line to be equal when said threshold level is reached during each transition, whereby all of the circuits respond simultaneously to the input signals to the line.

3. A synchronizing signal distribution system comprising a plurality of circuits which switch to first and second states in response to input signals above and below a predetermined threshold voltage level respectively, a transmission line having a predetermined signal delay time and characteristic impedance, means coupling each of the circuits to the transmission line, and means including a synchronizing signal source having an impedance matching that of the line to minimize reflections for applying signals, having transitions between voltage levels above and below said threshold level, to the line, the transition times of signal transitions of one polarity being sufficiently long to permit the voltage level at all points along the transmission line to be equal when said threshold level is reached during said transitions of one polarity, whereby all of the circuits respond simultaneously to said transitions of one polarity.

4. A minimum skew clock distribution system comprising a plurality of circuits all of which switch to first and second states in response to input signals above and below a predetermined threshold voltage level respectively, a transmission line having a predetermined signal delay time and characteristic impedance, means coupling the circuits to the line, and means having impedance matching that of the line to minimize reflections for applying signals having transitions between voltage levels above and below said threshold level, to the line, the transition times of the signals being sufficiently long to permit the voltage level at all points along the transmission line to be equal when said threshold level is reached during each transition, whereby all of the circuits respond simultaneously to the input signals to the line.

5. A clock signal distribution system comprising an open ended transmission line with a predetermined time delay $T$ and a selected characteristic impedance, a controlled electronic driver coupled to one end of the line, said driver having an output impedance matching that of the transmission line and applying to the line output signals having a slow transition time $Tr$ relative to the delay time of the line so that signal reflections from the other end of the line appear at the one end of the line before a predetermined threshold voltage is reached, and a plurality of electronic receiver circuits connected to the line at spaced points between the ends thereof and operated in first and second states in response to driver output signals above and below said predetermined threshold voltage respectively.

6. The combination of claim 5 wherein the rise time $Tr$ is selected according to the equation $$Tr \geqslant (Vg/Vt)\ T$$

where:

$Vg$ is the maximum voltage transition of the driver output signal, and $Vt$ is the voltage transition from one level of the driver output signal to said predetermined threshold voltage.

7. A clock signal distribution system comprising a closed loop transmission line with a characteristic impedance Zo and a time delay *Tl* for signals propagating around the loop, a controlled electronic driver coupled to the line and having an output impedance substantially equal to one-half Zo, a transmission feed line having a characteristic impedance equal to one-half Zo interposed between and coupling the driver to the line, said driver producing output signals having a slow rise time *Tr* relative to the delay time *Tl* so that signals applied by the driver to the transmission line propagate along the loop to cause the line voltage to be substantially equal at all points along the line before the threshold voltage is reached, and a plurality of electronic receiver circuits connected to the closed loop transmission line at spaced points and operated in first and second states in response to driver output signals above and below said predetermined threshold voltage respectively, said circuits being biased to switch between said states when said threshold voltage is crossed, whereby all of the circuits switch with minimum skew.

8. The combination of claim 5 wherein the rise time *Tr* is selected according to the equation $$Tr \geq Vg/Vt \cdot Tl/2$$

where:

*Vg* is the maximum voltage transition of the driver output signal, and

*Vt* is the voltage transition from one level of the driver output signal to said predetermined threshold voltage.

* * * * *